(12) United States Patent
Maurer et al.

(10) Patent No.: US 6,580,811 B2
(45) Date of Patent: Jun. 17, 2003

(54) WAVELET-BASED FACIAL MOTION CAPTURE FOR AVATAR ANIMATION

(75) Inventors: Thomas Maurer, Los Angeles, CA (US); Egor Valerievich Elagin, Los Angeles, CA (US); Luciano Pasquale Agostino Nocera, Los Angeles, CA (US); Johannes Bernhard Steffens, Culver City, CA (US); Hartmut Neven, Santa Monica, CA (US)

(73) Assignee: Eyematic Interfaces, Inc., Inglewood, CA (US)

(*) Notice: Subject to any disclaimer, the term of this patent is extended or adjusted under 35 U.S.C. 154(b) by 0 days.

(21) Appl. No.: 09/871,370

(22) Filed: May 31, 2001

(65) Prior Publication Data

US 2001/0033675 A1 Oct. 25, 2001

Related U.S. Application Data

(63) Continuation of application No. 09/188,079, filed on Nov. 6, 1998.
(60) Provisional application No. 60/081,615, filed on Apr. 13, 1998.

(51) Int. Cl.[7] .................................................. G06K 9/00
(52) U.S. Cl. ...................................... 382/103; 348/169
(58) Field of Search ........................... 382/103; 348/169

(56) References Cited

U.S. PATENT DOCUMENTS

| | | | |
|---|---|---|---|
| 4,725,824 A | 2/1988 | Yoshioka | 340/575 |
| 4,805,224 A | 2/1989 | Koezuka et al. | 382/8 |
| 4,827,413 A | 5/1989 | Baldwin et al. | 364/413.19 |
| 5,159,647 A | * 10/1992 | Burt | 382/37 |
| 5,168,529 A | 12/1992 | Peregrim et al. | 382/48 |
| 5,187,574 A | 2/1993 | Kosemura et al. | 358/108 |
| 5,220,441 A | 6/1993 | Gerstenberger | 358/487 |
| 5,280,530 A | * 1/1994 | Trew et al. | 382/1 |
| 5,333,165 A | 7/1994 | Sun | 378/10 |
| 5,383,013 A | 1/1995 | Cox | 356/2 |
| 5,430,809 A | 7/1995 | Tomitaka | 382/173 |
| 5,432,712 A | 7/1995 | Chan | 364/514 |
| 5,511,153 A | 4/1996 | Azarbayejani et al. | 395/119 |
| 5,533,177 A | 7/1996 | Wirtz et al. | 395/119 |
| 5,550,928 A | 8/1996 | Lu et al. | |
| 5,581,625 A | 12/1996 | Connell | |
| 5,588,033 A | 12/1996 | Yeung | 378/4 |
| 5,680,487 A | 10/1997 | Markandey | 382/291 |
| 5,699,449 A | 12/1997 | Javidi | 382/156 |
| 5,714,997 A | 2/1998 | Anderson | 348/39 |
| 5,715,325 A | 2/1998 | Bang et al. | 382/118 |
| 5,719,954 A | 2/1998 | Onda | 382/154 |
| 5,736,982 A | 4/1998 | Suzuki et al. | 345/330 |

(List continued on next page.)

FOREIGN PATENT DOCUMENTS

| | | | |
|---|---|---|---|
| DE | 44 06 020 C1 | 6/1995 | G06K/9/62 |
| EP | 0807902 A2 | 11/1997 | |
| WO | WO99/53443 | 10/1999 | |

*Primary Examiner*—Jayanti K. Patel
*Assistant Examiner*—Barry Choobin
(74) *Attorney, Agent, or Firm*—Gray Cary Ware & Freidenrich; Terrance A. Meador

(57) ABSTRACT

The present invention is embodied in an apparatus, and related method, for sensing a person's facial movements, features and characteristics and the like to generate and animate an avatar image based on facial sensing. The avatar apparatus uses an image processing technique based on model graphs and bunch graphs that efficiently represent image features as jets. The jets are composed of wavelet transforms processed at node or landmark locations on an image corresponding to readily identifiable features. The nodes are acquired and tracked to animate an avatar image in accordance with the person's facial movements. Also, the facial sensing may use jet similarity to determine the person's facial features and characteristic thus allows tracking of a person's natural characteristics without any unnatural elements that may interfere or inhibit the person's natural characteristics.

12 Claims, 16 Drawing Sheets

U.S. PATENT DOCUMENTS

| | | | |
|---|---|---|---|
| 5,764,803 A | 6/1998 | Jacquin et al. | 382/236 |
| 5,774,591 A | 6/1998 | Black et al. | 382/236 |
| 5,802,220 A * | 9/1998 | Black et al. | 382/276 |
| 5,809,171 A | 9/1998 | Neff et al. | 382/209 |
| 5,828,769 A | 10/1998 | Burns | 382/118 |
| 5,917,937 A | 6/1999 | Szeliski et al. | |
| 5,982,853 A * | 11/1999 | Libermann | 379/52 |
| 5,995,119 A * | 11/1999 | Cosatto et al. | 345/473 |
| 6,011,562 A | 1/2000 | Gagné | |
| 6,044,168 A * | 3/2000 | Tuceryan et al. | 382/116 |
| 6,052,123 A * | 4/2000 | Lection et al. | 345/419 |
| 6,301,370 B1 * | 10/2001 | Steffens et al. | 342/90 |

* cited by examiner

US 6,580,811 B2

WAVELET-BASED FACIAL MOTION CAPTURE FOR AVATAR ANIMATION

This application is a continuation of U.S. Ser. No. 09/188,079, filed Nov. 6, 1998 which claims priority from U.S. Patent Application Ser. No. 60/081,615, filed Apr. 13, 1998.

FIELD OF THE INVENTION

The present invention relates to dynamic facial feature sensing, and more particularly, to a vision-based motion capture system that allows real-time finding, tracking and classification of facial features for input into a graphics engine that animates an avatar.

BACKGROUND OF THE INVENTION

Virtual spaces filled with avatars are an attractive way to allow for the experience of a shared environment. However, existing shared environments generally lack facial feature sensing of sufficient quality to allow for the incarnation of a user, i.e., the endowment of an avatar with the likeness, expressions or gestures of the user. Quality facial feature sensing is a significant advantage because facial gestures are a primordial means of communications. Thus, the incarnation of a user augments the attractiveness of virtual spaces.

Existing methods of facial feature sensing typically use markers that are glued to a person's face. The use of markers for facial motion capture is cumbersome and has generally restricted the use of facial motion capture to high-cost applications such as movie production. Accordingly, there exists a significant need for a vision based motion capture systems that implements convenient and efficient facial feature sensing. The present invention satisfies this need.

SUMMARY OF THE INVENTION

The present invention is embodied in an apparatus, and related method, for sensing a person's facial movements, features or characteristic. The results of the facial sensing may be used to animate an avatar image. The avatar apparatus uses an image processing technique based on model graphs and bunch graphs that efficiently represent image features as jets composed of wavelet transforms at landmarks on a facial image corresponding to readily identifiable features. The sensing system allows tracking of a person's natural characteristics without any unnatural elements to interfere with the person's natural characteristics.

The feature sensing process operates on a sequence of image frames transforming each image frame using a wavelet transformation to generate a transformed image frame. Node locations associated with wavelets jets of a model graph to the transformed image frame are initialized by moving the model graph across the transformed image frame and placing the model graph at a location in the transformed image frame of maximum jet similarity between the wavelet jets at the node locations and the transformed image frame. The location of one or more node locations of the model graph is tracked between image frames. A tracked node is reinitialized if the node's position deviates beyond a predetermined position constraint between image frames.

In one embodiment of the invention, the facial feature finding may be based on elastic bunch graph matching for individualizing a head model. Also, the model graph for facial image analysis may include a plurality of location nodes (e.g., 18) associated with distinguishing features on a human face.

Other features and advantages of the present invention should be apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention is embodied in an apparatus, and related method, for sensing a person's facial movements, features and characteristics and the like to generate and animate an avatar image based on the facial sensing. The avatar apparatus uses an image processing technique based on model graphs and bunch graphs that efficiently represent image features as jets. The jets are composed of wavelet transforms are processed at node or landmark locations on an image corresponding to readily identifiable features. The nodes are acquired and tracked to animate an avatar image in accordance with the person's facial movements. Also, the facial sensing may use jet similarity to determine the person's facial features and characteristics thus allowing tracking of a person's natural characteristics without any unnatural elements that may interfere with the person's natural characteristics.

Figure 1:
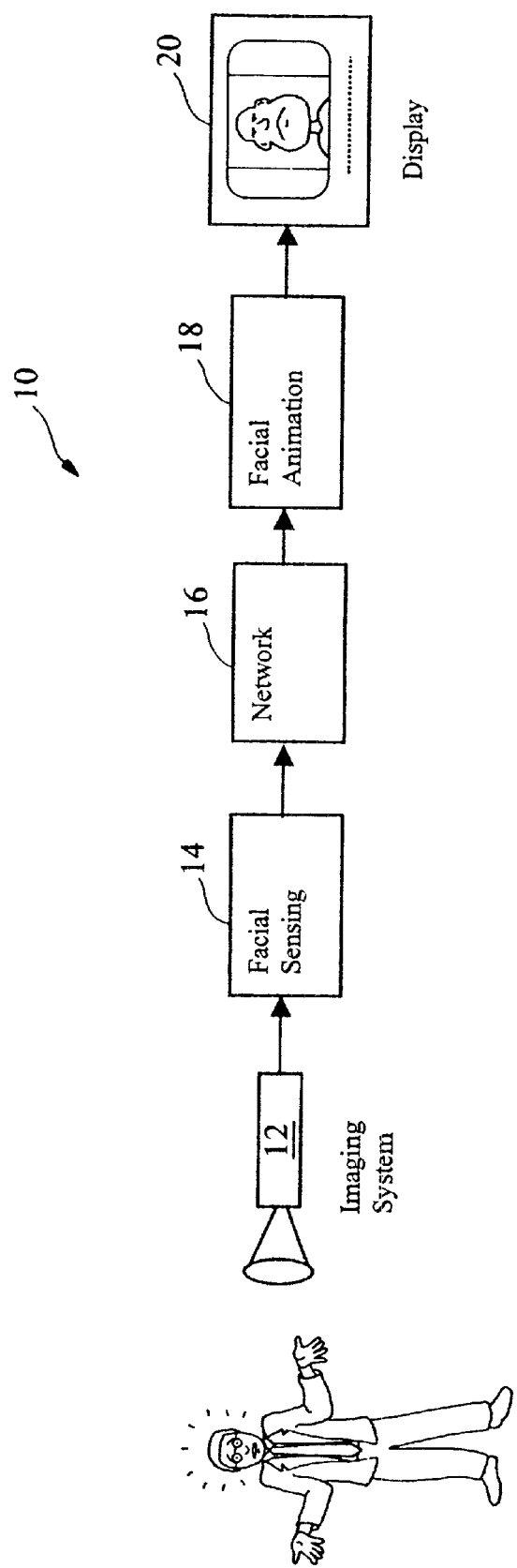
FIG. 1 is a block diagram of an avatar animation system and process, according to the invention.

As shown in FIG. 1, the avatar animation system 10 of the invention includes an imaging system 12, a facial sensing process 14, a data communication network 16, a facial animation process 18, and an avatar display 20. The imaging system acquires and digitizes a live video image signal of a person thus generating a stream of digitized video data organized into image frames. The digitized video image data is provided to the facial sensing process which locates the person's face and corresponding facial features in each frame. The facial sensing process also tracks the positions and characteristics of the facial features from frame-to-frame. The tracking information may be transmitted via the network to one or more remote sites which receives the information and generates, using a graphics engine, an animated facial image on the avatar display. The animated facial image may be based on a photorealistic model of the person, a cartoon character or a face completely unrelated to the user.

Figure 2:
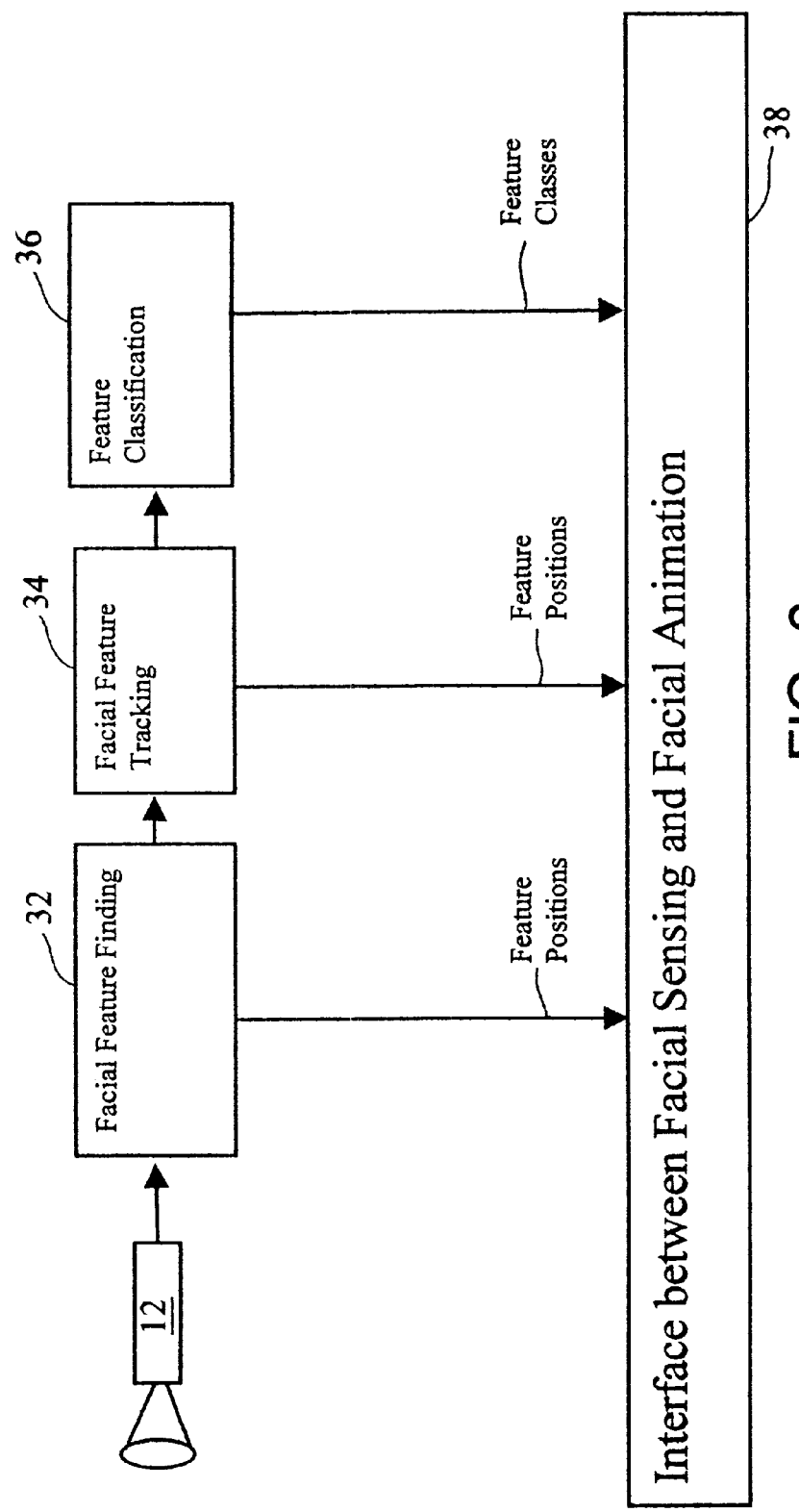
FIG. 2 is block diagram of a facial feature sensing apparatus and process, according to the invention, for the avatar animation system and process of FIG. 1.
Figure 3:
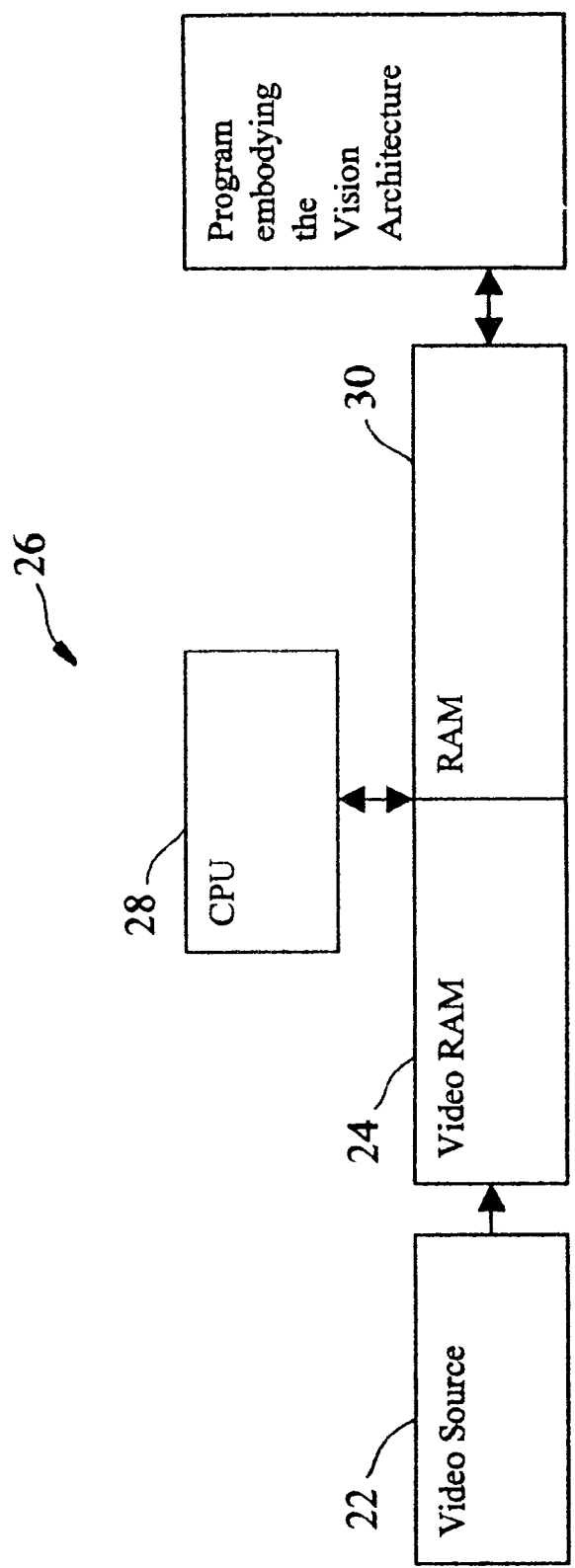
FIG. 3 is a block diagram of a video image processor for implementing the facial feature sensing apparatus of FIG. 2.

The imaging system 12 and the facial sensing process 14 are shown in more detail in FIGS. 2 and 3. The imaging system captures the person's image using a digital video camera 22 which generates a stream of video image frames. The video image frames are transferred into a video random-access memory (VRAM) 24 for processing. A satisfactory imaging system is the Matrox Meteor II available from Matrox™ which generates digitizing images produced by a conventional CCD camera and transfers the images in real-time into the memory at a frame rate of 30 Hz. The image frame is processed by an image processor 26 having a central processing unit (CPU) 28 coupled to the VRAM and random-access memory RAM 30. The RAM stores program code and data for implementing the facial sensing and avatar animation processes.

The facial feature process operates on the digitized images to find the person's facial feature (block 32), track the features (block 34), and reinitializes feature tracking as needed. The facial features also may be classified (block 36). The facial feature process generates data associated with the position and classification of the facial features with is provided to an interface with the facial animation process (block 38).

Figure 4:
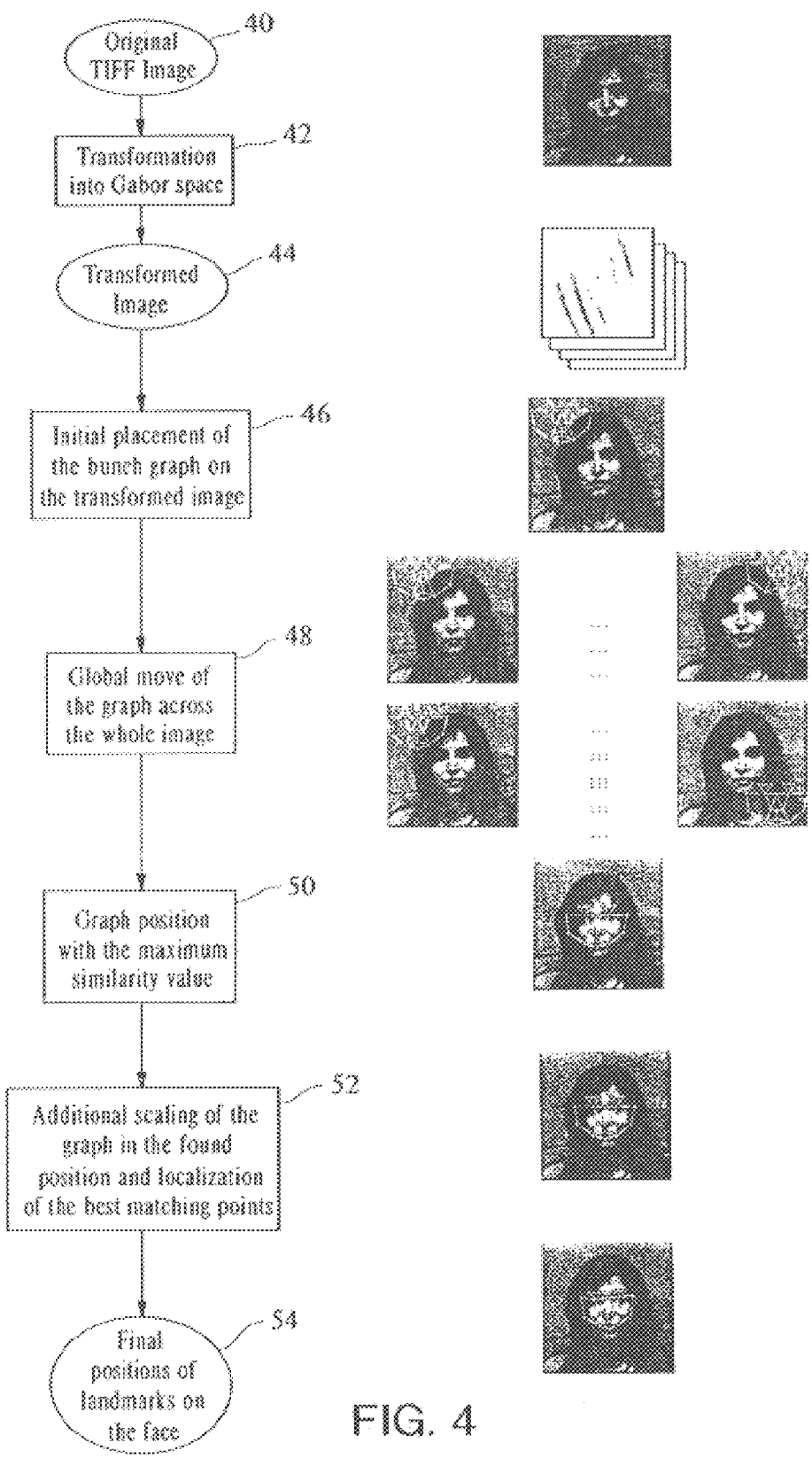
FIG. 4 is a flow diagram, with accompanying photographs, for illustrating a landmark finding technique of the facial feature sensing apparatus and system of FIG. 2.

The facial feature may be located using an elastic graph matching shown in FIG. 4. In the elastic graph matching technique, a captured image (block 40) is transformed into Gabor space using a wavelet transformation (block 42) which is described below in more detail with respect to FIG. 5. The transformed image (block 44) is represented by 40 complex values, representing wavelet components, per each pixel of the original image. Next, a rigid copy of a model graph, which is described in more detail below with respect to FIG. 7, is positioned over the transformed image at varying model node positions to locate a position of optimum similarity (block 46). The search for the optimum similarity may be performed by positioning the model graph in the upper left hand corner of the image, extracting the jets at the nodes, and determining the similarity between the image graph and the model graph. The search continues by sliding the model graph left to right starting from the upper-left corner of the image (block 48). When a rough position of the face is found (block 50), the nodes are individually allowed to move, introducing elastic graph distortions (block 52). A phase-insensitive similarity function is used in order to locate a good match (block 54). A phase-sensitive similarity function is then used to locate a jet with accuracy because the phase is very sensitive to small jet displacements. The phase-insensitive and the phase-sensitive similarity functions are described below with respect to FIGS. 5–8. Note that although the graphs are shown in FIG. 4 with respect to the original image, the model graph movements and matching are actually performed on the transformed image.

Figure 5:
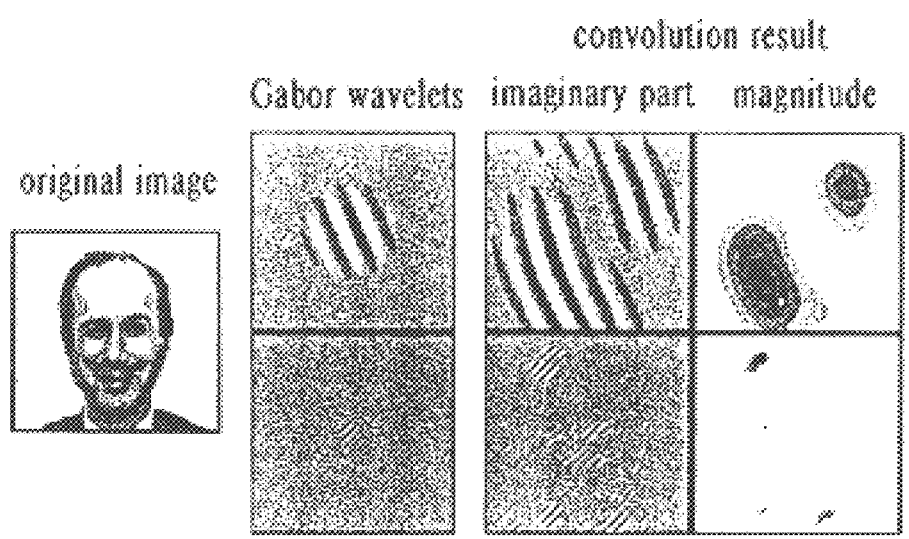
FIG. 5 is a series of images showing processing of a facial image using Gabor wavelets, according to the invention.

The wavelet transform is described with reference to FIG. 5. An original image is processed using a Gabor wavelet to generate a convolution result. The Gabor-based wavelet consists of a two-dimensional complex wave field modulated by a Gaussian envelope.

$$\psi_{\vec{k}}(x) = \frac{k^2}{\sigma^2} e^{-x^2 \frac{k^2}{2\sigma^2}} \left\{ e^{i\vec{k}\vec{x}} - e^{\frac{-\sigma^2}{2}} \right\} \quad (1)$$

The wavelet is a plane wave with wave vector $\vec{k}$, restricted by a Gaussian window, the size of which relative to the wavelength is parameterized by σ. The term in the brace removes the DC component. The amplitude of the wavevector k may be chosen as follows where v is related to the desired spacial resolutions.

$$k_v = 2^{-\frac{v+2}{2}} \pi, v = 1, 2, \ldots \quad (2)$$

A wavelet, centered at image position $\vec{x}$ is used to extract the wavelet component $J_{\vec{k}}$ from the image with gray level distribution $I(\vec{x})$, $$J_{\vec{k}}(\vec{x}) = \int d\vec{x}' I(\vec{x}') \psi_{\vec{k}}(\vec{x} - \vec{x}') \quad (3)$$

The space of wave vectors $\vec{k}$ is typically sampled in a discrete hierarchy of 5 resolution levels (differing by half-octaves) and 8 orientations at each resolution level (see, e.g., FIG. 8), thus generating 40 complex values for each sampled image point (the real and imaginary components referring to the cosine and sine phases of the plane wave). The samples in k-space are designated by the index j=1, . . . , 40 and all wavelet components centered in a single image point are considered as a vector which is called a jet 60, shown in FIG. 6. Each jet describes the local features of the area surrounding $\vec{x}$. If sampled with sufficient density, the image may be reconstructed from jets within the bandpass covered by the sampled frequencies. Thus, each component of a jet is the filter response of a Gabor wavelet extracted at a point (x, y) of the image.

Figure 6:
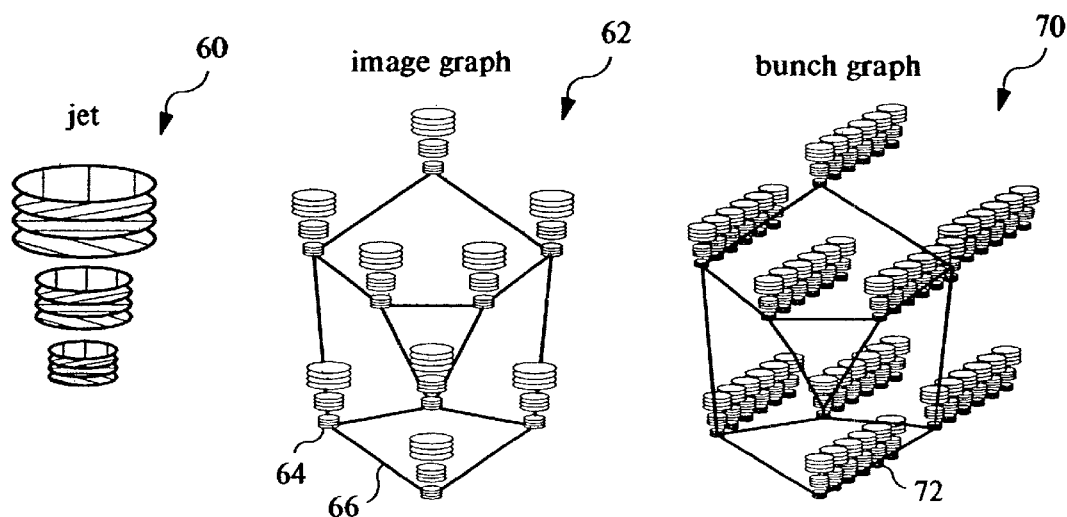
FIG. 6 is a series of graphs showing the construction of a jet, image graph, and bunch graph using the wavelet processing technique of FIG. 5, according to the invention.
Figure 7:
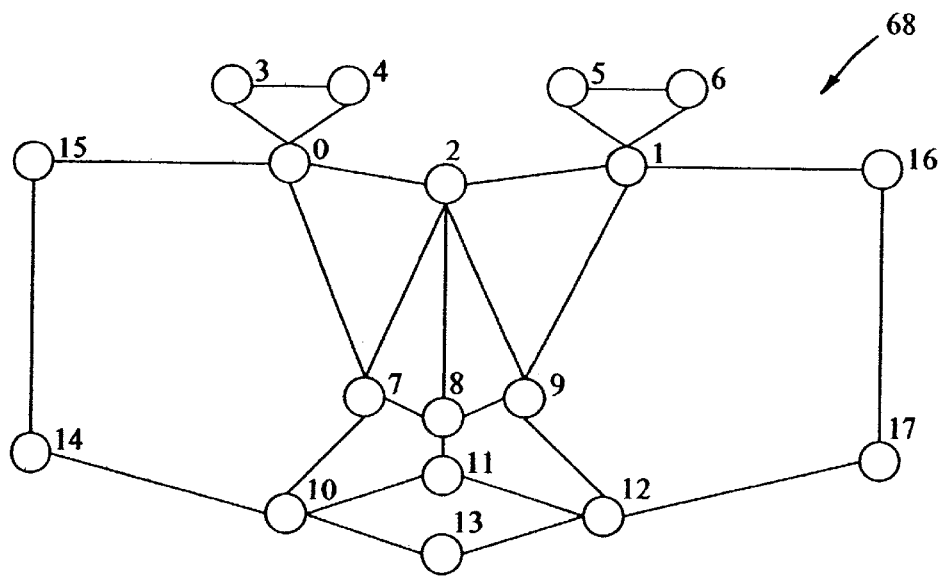
FIG. 7 is a diagram of a model graph, according to the invention, for processing facial images.
Figure 8:
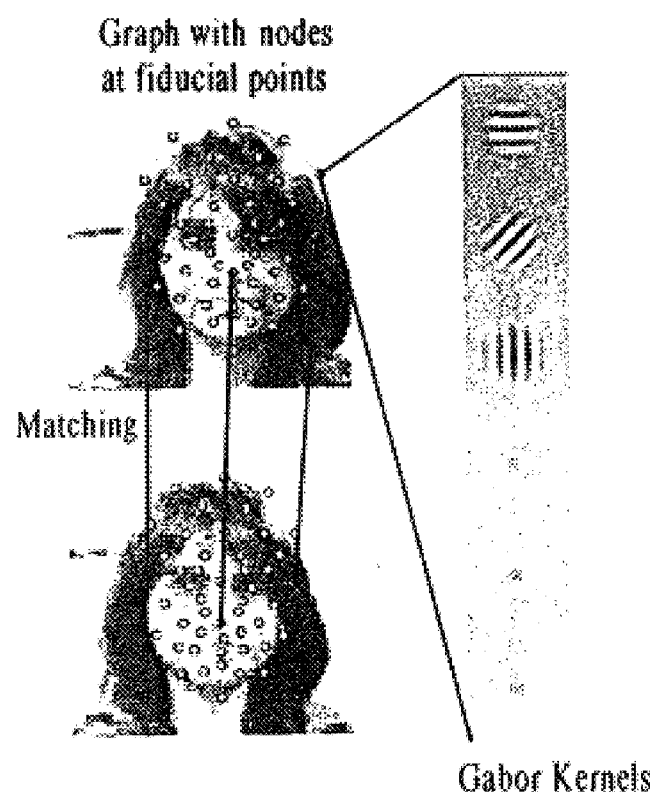
FIG. 8 includes two diagrams showing the use of wavelet processing to locate facial feature.

A labeled image graph 62, as shown in FIG. 6, is used to describe the aspect of an object (in this context, a face). The nodes 64 of the labeled graph refer to points on the object and are labeled by jets 60. Edges 66 of the graph are labeled with distance vectors between the nodes. Nodes and edges define the graph topology. Graphs with equal topology can be compared. The normalized dot product of the absolute components of two jets defines the jet similarity. This value is independent of contrast changes. To compute the similarity between two graphs, the sum is taken over similarities of corresponding jets between the graphs.

A model graph 68 that is particularly designed for finding a human face in an image is shown in FIG. 7. The numbered nodes of the graph have the following locations:

| 0 | right eye pupil |
| --- | --- |
| 1 | left eye pupil |
| 2 | top of the nose |
| 3 | right corner of the right eyebrow |
| 4 | left corner of the right eyebrow |
| 5 | right corner of the left eyebrow |
| 6 | left corner of the left eyebrow |
| 7 | right nostril |
| 8 | tip of the nose |
| 9 | left nostril |
| 10 | right corner of the mouth |
| 11 | center of the upper lip |
| 12 | left corner of the mouth |
| 13 | center of the lower lip |
| 14 | bottom of the right ear |
| 15 | top of the right ear |
| 16 | top of the left ear |
| 17 | bottom of the left ear |

To represent a face, a data structure called bunch graph 70 (FIG. 6) is used. It is similar to the graph described above, but instead of attaching only a single jet to each node, a whole bunch of jets 72 (a bunch jet) are attached to each node. Each jet is derived from a different facial image. To form a bunch graph, a collection of facial images (the bunch graph gallery) is marked with node locations at defined positions of the head. These defined positions are called landmarks. When matching a bunch graph to an image, the jet extracted from the image is compared to all jets in the corresponding bunch attached to the bunch graph and the best-matching one is selected. This matching process is called elastic bunch graph matching. When constructed using a judiciously selected gallery, a bunch graph covers a great variety of faces that may have significantly different local properties e.g. samples of male and female faces, and of persons of different ages or races.

Again in order to find a face in an image frame, the graph is moved and scaled and distorted until a place is located at which the graph matches best (the best fitting jets within the bunch jets are most similar to jets extracted from the image at the current positions of the nodes). Since face features differ from face to face, the graph is made more general for the task, e.g. each node is assigned with jets of the corresponding landmark taken from 10 to 100 individual faces.

Two different jet similarity functions for two different, or even complementary, tasks are employed. If the components of a jet $\vec{J}$ are written in the form with amplitude and phase $\phi_j$ one form for the similarity of two jets $\vec{J}$ and $\vec{J}'$ is the normalized scalar product of the amplitude vector $$S(\vec{J}, \vec{J}') = \frac{\sum a_j a'_j}{\sqrt{\sum a_j^2 \sum a'^2_j}} \quad (4)$$

The other similarity function has the form $$S(\vec{J}, \vec{J}') = \frac{\sum a_j a'_j \cos(\phi_j - \phi'_j - \vec{d}\vec{k}_j)}{\sqrt{\sum a_j^2 \sum a'^2_j}} \quad (5)$$

This function includes a relative displacement vector between the image points to which the two jets refer. When comparing two jets during graph matching, the similarity between them is maximized with respect to d, leading to an accurate determination of jet position. Both similarity functions are used, with preference often given to the phase-insensitive version (which varies smoothly with relative position) when first matching a graph, and to the phase-sensitive version when accurately positioning the jet.

Figure 9:
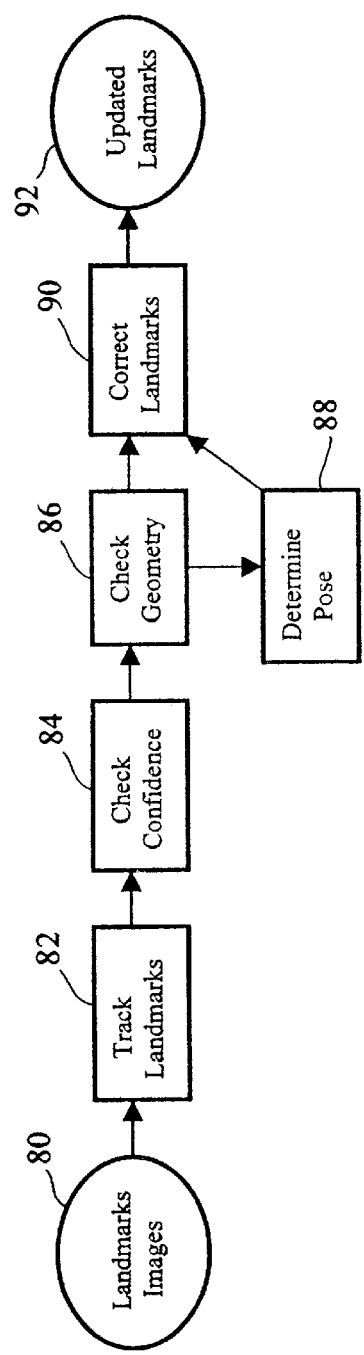
FIG. 9 is a flow diagram showing a tracking technique for tracking landmarks found by the landmark finding technique of FIG. 4.

After the facial features are located, the facial features may be tracked over consecutive frames as illustrated in FIG. 9. The tracking technique of the invention achieves robust tracking over long frame sequences by using a tracking correction scheme that detects whether tracking of a feature or node has been lost and reinitializes the tracking process for that node.

The position X_n of a single node in an image I_n of an image sequence is known either by landmark finding on image I_n using the landmark finding method (block 80) described above, or by tracking the node from image I_(n-1) to I_n using the tracking process. The node is then tracked (block 82) to a corresponding position X_(n+1) in the image I_(n+1) by one of several techniques. The tracking methods described below advantageously accommodate fast motion.

A first tracking technique involves linear motion prediction. The search for the corresponding node position X_(n+1) in the new image I_(n+1) is started at a position generated by a motion estimator. A disparity vector (X_n–X_(n-1)) is calculated that represents the displacement, assuming constant velocity, of the node between the preceding two frames. The disparity or displacement vector D_n may be added to the position X_n to predict the node position X_(n+1). This linear motion model is particularly advantageous for accommodating constant velocity motion. The linear motion model also provides good tracking if the frame rate is high compared to the acceleration of the objects being tracked. However, the linear motion model performs poorly if the frame rate is too low compared to the acceleration of the objects in the image sequence. Because it is difficult for any motion model to track objects under such conditions, use of a camera having a higher frame rate is recommended.

The linear motion model may generate too large of an estimated motion vector D_n which could lead to an accumulation of the error in the motion estimation. Accordingly, the linear prediction may be damped using a damping factor f_D. The resulting estimated motion vector is D_n=f_D*(X_n–X_(n-1)). A suitable damping factor is 0.9. If no previous frame I_(n-1) exist, e.g., for a frame immediately after landmark finding, the estimated motion vector is set equal to zero (D_n=0).

Figure 10:
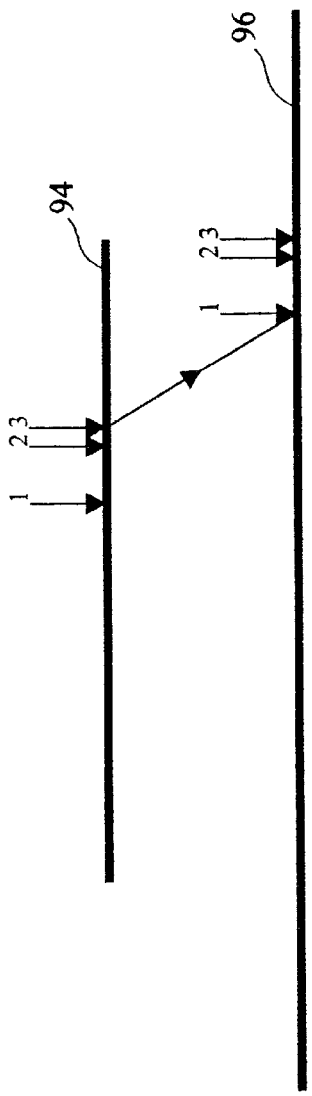
FIG. 10 is a diagram of a Gaussian image pyramid technique for illustrating landmark tracking in one dimension.

A tracking technique based on a Gaussian image pyramid, applied to one dimension, is illustrated in FIG. 10. Instead of using the original image resolution, the image is down sampled 2–4 times to create a Gaussian pyramid of the image. An image pyramid of 4 levels results in a distance of 24 pixels on the finest, original resolution level being represented as only 3 pixels on the coarsest level. Jets may be computed and compared at any level of the pyramid.

Tracking of a node on the Gaussian image pyramid is generally performed first at the most coarse level and then preceding to the most fine level. A jet is extracted on the coarsest Gauss level of the actual image frame I__(n+1) at the position X__(n+1) using the damped linear motion estimation X__(n+1)=(X__n+D__n) as described above, and compared to the corresponding jet computed on the coarsest Gauss level of the previous image frame. From these two jets, the disparity is determined, i.e., the 2D vector R pointing from X__(n+1) to that position that corresponds best to the jet from the previous frame. This new position is assigned to X__(n+1). The disparity calculation is described below in more detail. The position on the next finer Gauss level of the actual image (being 2*X__(n+1)), corresponding to the position X__(n+1) on the coarsest Gauss level is the starting point for the disparity computation on this next finer level. The jet extracted at this point is compared to the corresponding jet calculated on the same Gauss level of the previous image frame. This process is repeated for all Gauss levels until the finest resolution level is reached, or until the Gauss level is reached which is specified for determining the position of the node corresponding to the previous frame's position.

Two representative levels of the Gaussian image pyramid are shown in FIG. 10, a coarser level 94 above, a finer level 96 below. Each jet is assumed to have filter responses for two frequency levels. Starting at position 1 on the coarser Gauss level, X__(n+1)=X__n+D__n, a first disparity move using only the lowest frequency jet coefficients leads to position 2. A second disparity move by using all jet coefficients of both frequency levels leads to position 3, the final position on this Gauss level. Position 1 on the finer Gauss level corresponds to position 3 on the coarser level with the coordinates being doubled. The disparity move sequence is repeated, and position 3 on the finest Gauss level is the final position of the tracked landmark. For more accurate tracking, the number of Gauss and frequency levels may be increased. After the new position of the tracked node in the actual image frame has been determined, the jets on all Gauss levels are computed at this position. A stored array of jets that was computed for the previous frame, representing the tracked node, is then replaced by a new array of jets computed for the current frame.

Use of the Gauss image pyramid has two main advantages: First, movements of nodes are much smaller in terms of pixels on a coarser level than in the original image, which makes tracking possible by performing only a local move instead of an exhaustive search in a large image region. Second, the computation of jet components is much faster for lower frequencies, because the computation is performed with a small kernel window on a down sampled image, rather than on a large kernel window on the original resolution image.

Note, that the correspondence level may be chosen dynamically, e.g., in the case of tracking facial features, correspondence level may be chosen dependent on the actual size of the face. Also the size of the Gauss image pyramid may be alter through the tracking process, i.e., the size may be increased when motion gets faster, and decreased when motion gets slower. Typically, the maximal node movement on the coarsest Gauss level is limited 4 pixels. Also note that the motion estimation is often performed only on the coarsest level.

The computation of the displacement vector between two given jets on the same Gauss level (the disparity vector), is now described. To compute the displacement between two consecutive frames, a method is used which was originally developed for disparity estimation in stereo images, based on D. J. Fleet and A. D. Jepson. Computation of component image velocity from local phase information. In International Journal of Computer Vision, volume 5, issue 1, pages 77–104. 1990. and W. M. Theimer and H. A. Mallot. Phase-based binocular vergence control and depth reconstruction using active vision. In CVGIP: Image Undersanding, volume 60, issue 3, pages 343–358. November 1994.

The strong variation of the phases of the complex filter responses is used explicitly to compute the displacement with subpixel accuracy (Wiskott, L., "Labeled Graphs and Dynamic Link Matching for Face Recognition and Scene Analysis", Verlag Harri Deutsch, Thun-Frankfurt am Main, Reihe Physik 53 (PhD thesis, 1995). By writing the response J to the jth Gabor filter in terms of amplitude $a_j$ and phase j, a similarity function can be defined as $$S(J, J', d) = \frac{\sum_j a_j a'_j \cos(\phi_j - \phi'_j - d \cdot k_j)}{\sqrt{\sum_j a_j^2 \sum_j a_j'^2}} \quad (6)$$

Let J and J' be two jets at positions X and X'=X+d, the displacement d may be found by maximizing the similarity S with respect to d, the $k_j$ being the wavevectors associated with the filter generating $J_j$. Because the estimation of d is only precise for small displacements, i.e., large overlap of the Gabor jets, large displacement vectors are treated as a first estimate only, and the process is repeated in the following manner. First, only the filter responses of the lowest frequency level are used resulting in a first estimate d__1. Next, this estimate is executed and the jet J is recomputed at the position X__1=X+d__1, which is closer to the position X' of jet J'. Then, the lowest two frequency levels are used for the estimation of the displacement d__2, and the jet J is recomputed at the position X__2=X__1+d__2. This is iterated until the highest frequency level used is reached, and the final disparity d between the two start jets J and J' is given as the sum d=d__1+d__2+ . . . . Accordingly, displacements of up to half the wavelength of the kernel with the lowest frequency may be computed (see Wiskott 1995, supra).

Although the displacements are determined using floating point numbers, jets may be extracted (i.e., computed by convolution) at (integer) pixel positions only, resulting in a systematic rounding error. To compensate for this subpixel error Δd, the phases of the complex Gabor filter responses should be shifted according to $$\Delta\phi_j = \Delta d \cdot k_j \quad (7)$$

so that the jets will appear as if they were extracted at the correct subpixel position. Accordingly, the Gabor jets may be tracked with subpixel accuracy without any further accounting of rounding errors. Note that Gabor jets provide a substantial advantage in image processing because the problem of subpixel accuracy is more difficult to address in most other image processing methods.

Tracking error may be detected by determining whether a confidence or similarity value is smaller than a predetermined threshold (block 84 of FIG. 9). The similarity (or confidence) value S may be calculated to indicate how well the two image regions in the two image frames correspond to each other simultaneous with the calculation of the displacement of a node between consecutive image frames. Typically, the confidence value is close to 1, indicating good correspondence. If the confidence value is not close to 1, either the corresponding point in the image has not been found (e.g., because the frame rate was too low compared to the velocity of the moving object), or this image region has changed so drastically from one image frame to the next, that the correspondence is no longer well defined (e.g., for the node tracking the pupil of the eye the eyelid has been closed). Nodes having a confidence value below a certain threshold may be switched off.

A tracking error also may be detected when certain geometrical constraints are violated (block 86). If many nodes are tracked simultaneously, the geometrical configuration of the nodes may be checked for consistency. Such geometrical constraints may be fairly loose, e.g., when facial features are tracked, the nose must be between the eyes and the mouth. Alternatively, such geometrical constraints may be rather accurate, e.g., a model containing the precise shape information of the tracked face. For intermediate accuracy, the constraints may be based on a flat plane model. In the flat plane model, the nodes of the face graph are assumed to be on a flat plane. For image sequences that start with the frontal view, the tracked node positions may be compared to the corresponding node positions of the frontal graph transformed by an affine transformation to the actual frame. The 6 parameters of the optimal affine transformation are found by minimizing the least squares error in the node positions. Deviations between the tracked node positions and the transformed node positions are compared to a threshold. The nodes having deviations larger than the threshold are switched off. The parameters of the affine transformation may be used to determine the pose and relative scale (compared to the start graph) simultaneously (block 88). Thus, this rough flat plane model assures that tracking errors may not grow beyond a predetermined threshold.

If a tracked node is switched off because of a tracking error, the node may be reactivated at the correct position (block 90), advantageously using bunch graphs that include different poses and tracking continued from the corrected position (block 92). After a tracked node has been switched off, the system may wait until a predefined pose is reached for which a pose specific bunch graph exists. Otherwise, if only a frontal bunchgraph is stored, the system must until the frontal pose is reached to correct any tracking errors. The stored bunch of jets may be compared to the image region surrounding the fit position (e.g., from the flat plane model), which works in the same manner as tracking, except that instead of comparing with the jet of the previous image frame, the comparison is repeated with all jets of the bunch of examples, and the most similar one is taken. Because the facial features are known, e.g., the actual pose, scale, and even the rough position, graph matching or an exhaustive searching in the image and/or pose space is not needed and node tracking correction may be performed in real time.

Figure 11:
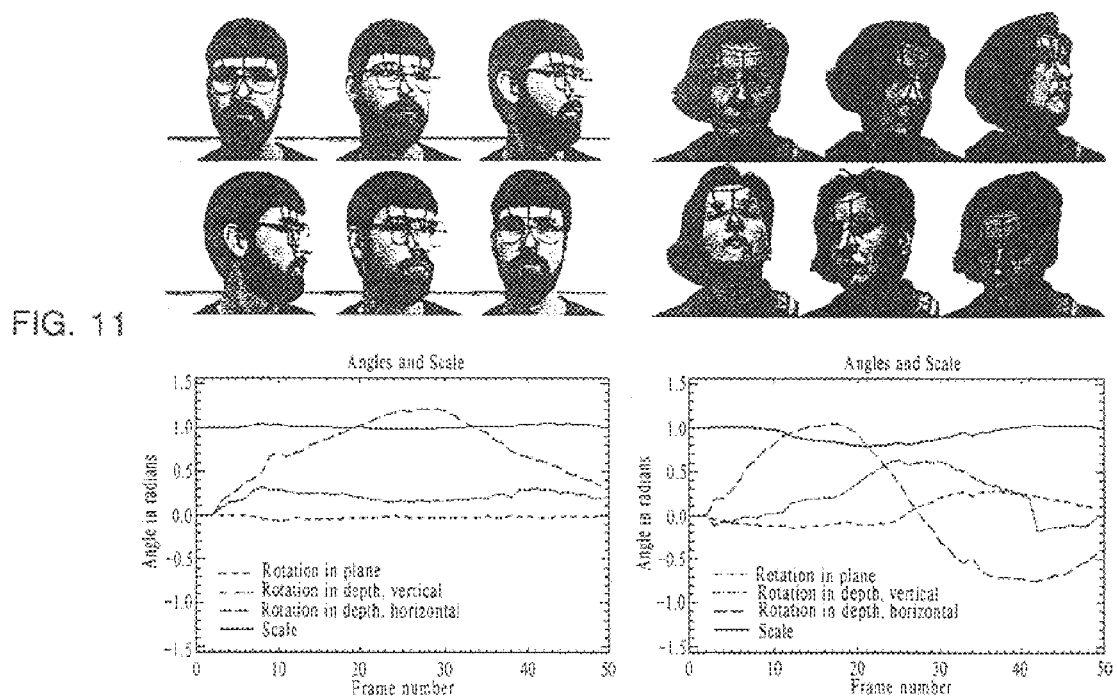
FIG. 11 is a series of two facial images, with accompanying graphs of pose angle versus frame number, showing tracking of facial features over a sequence of 50 image frames.

For tracking correction, bunch graphs are not needed for many different poses and scales because rotation in the image plane as well as scale may be taken into account by transforming either the local image region or the jets of the bunch graph accordingly as shown in FIG. 11. In addition to the frontal pose, bunch graphs need to be created only for rotations in depth.

The speed of the reinitialization process may be increased by taking advantage of the fact that the identity of the tracked person remains the same during an image sequence. Accordingly, in an initial learning session, a first sequence of the person may be taken with the person exhibiting a full repertoire of frontal facial expressions. This first sequence may be tracked with high accuracy using the tracking and correction scheme described above based on a large generalized bunch graph that contains knowledge about many different persons. This process may be performed offline and generates a new personalized bunch graph. The personalized bunch graph then may be used for tracking this person at a fast rate in real time because the personalized bunch graph is much smaller than the larger, generalized bunch graph.

The speed of the reinitialization process also may be increased by using a partial bunch graph reinitialization. A partial bunch graph contains only a subset of the nodes of a full bunch graph. The subset may be as small as only a single node.

Figure 12:
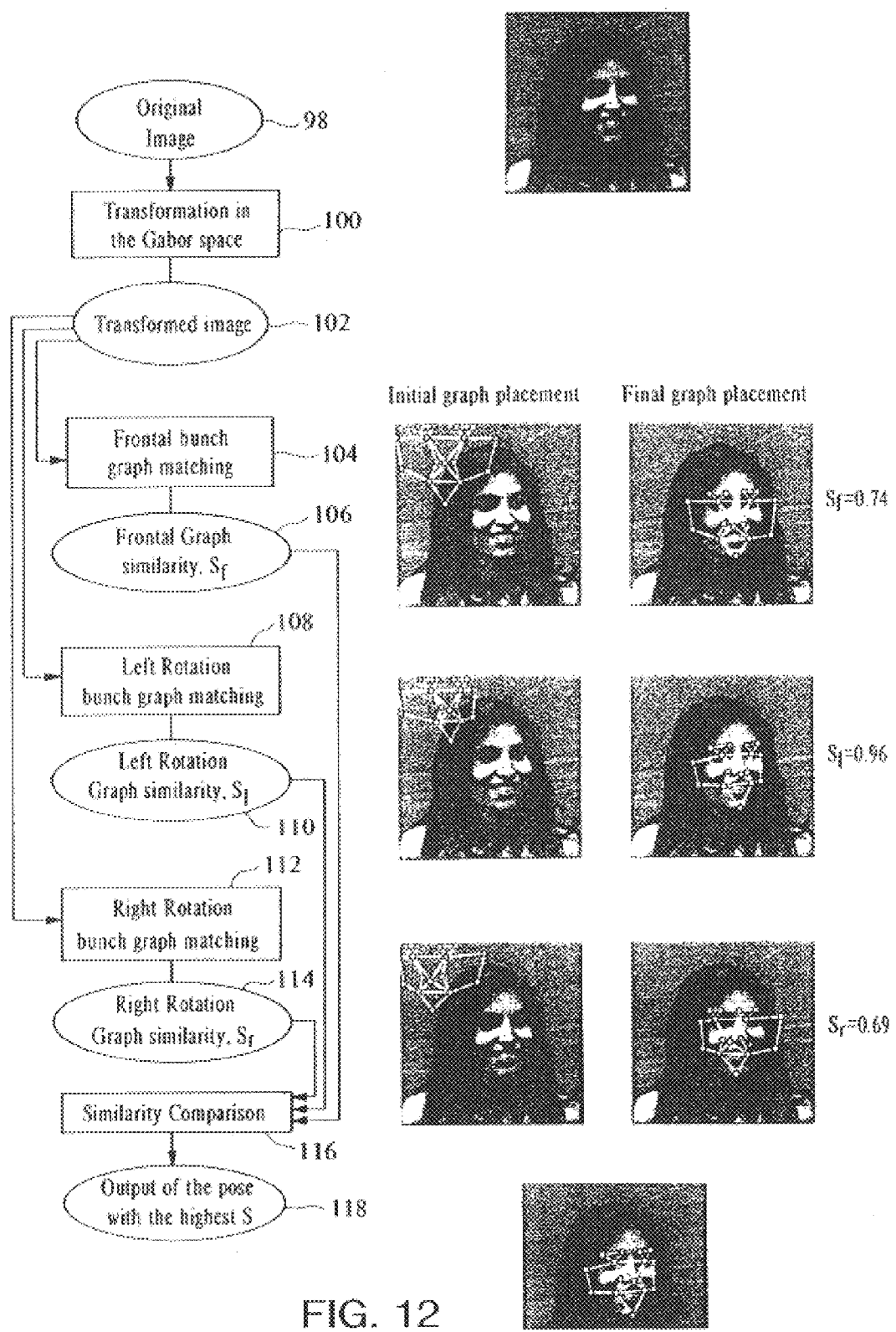
FIG. 12 is a flow diagram, with accompanying photographs, for illustrating a pose estimation technique of the facial feature sensing apparatus and system of FIG. 2.

A pose estimation bunch graph makes use of a family of two-dimensional bunch graphs defined in the image plane. The different graphs within one family account for different poses and/or scales of the head. The landmark finding process attempts to match each bunch graph from the family to the input image in order to determine the pose or size of the head in the image. An example of such pose-estimation procedure is shown in FIG. 12. The first step of the pose estimation is equivalent to that of the regular landmark finding. The image (block 98) is transformed (blocks 100 and 102) in order to use the graph similarity functions. Then, instead of only one, a family of three bunch graphs is used. The first bunch graph contains only the frontal pose faces (equivalent to the frontal view described above), and the other two bunch graphs contain quarter-rotated faces (one representing rotations to the left and one to the right). As before, the initial positions for each of the graphs is in the upper left corner, and the positions of the graphs are scanned on the image and the position and graph returning the highest similarity after the landmark finding is selected (blocks 104–114) After initial matching for each graph, the similarities of the final positions are compared (block 116). The graph that best corresponds to the pose given on the image will have the highest similarity. In FIG. 12, the left-rotated graph provides the best fit to the image, as indicated by its similarity (block 118). Depending on resolution and degree of rotation of the face in the picture, similarity of the correct graph and graphs for other poses would vary, becoming very close when the face is about half way between the two poses for which the graphs have been defined. By creating bunch graphs for more poses, a finer pose estimation procedure may be implemented that would discriminate between more degrees of head rotation and handle rotations in other directions (e.g. up or down).

In order to robustly find a face at an arbitrary distance from the camera, a similar approach may be used in which two or three different bunch graphs each having different scales may be used. The face in the image will be assumed to have the same scale as the bunch graph that returns the most to the facial image.

A three dimensional (3D) landmark finding techniques related to the technique described above also may use multiple bunch graphs adapted to different poses. However, the 3D approach employs only one bunch graph defined in 3D space. The geometry of the 3D graph reflects an average face or head geometry. By extracting jets from images of the faces of several persons in different degrees of rotation, a 3D bunch graph is created which is analogous to the 2D approach. Each jet is now parameterized with the three rotation angles. As in the 2D approach, the nodes are located at the fiducial points of the head surface. Projections of the 3D graph are then used in the matching process. One important generalization of the 3D approach is that every node has the attached parameterized family of bunch jets adapted to different poses. The second generalization is that the graph may undergo Euclidean transformations in 3D space and not only transformations in the image plane.

The graph matching process may be formulated as a coarse-to-fine approach that first utilizes graphs with fewer nodes and kernels and then in subsequent steps utilizes more dense graphs. The coarse-to-fine approach is particularly suitable if high precision localization of the feature points in certain areas of the face is desired. Thus, computational effort is saved by adopting a hierarchical approach in which landmark finding is first performed on a coarser resolution, and subsequently the adapted graphs are checked at a higher resolution to analyze certain regions in finer detail.

Further, the computational workload may be easily split on a multi-processor machine such that once the coarse regions are found, a few child processes start working in parallel each on its own part of the whole image. At the end of the child processes, the processes communicate the feature coordinates that they located to the master process, which appropriately scales and combines them to fit back into the original image thus considerably reducing the total computation time.

Figure 13:
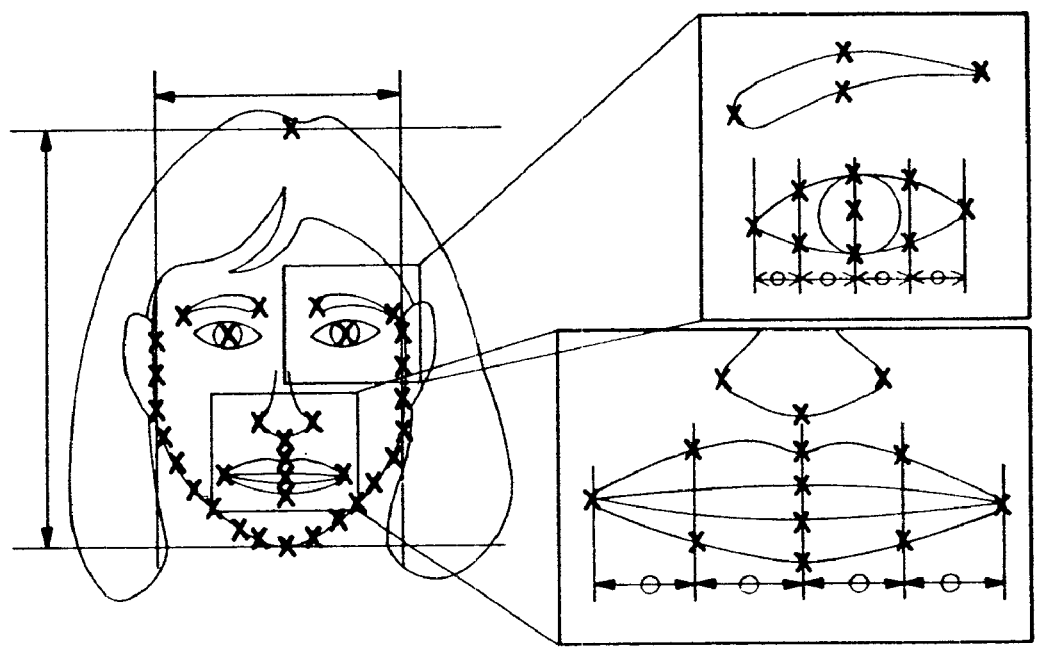
FIG. 13 is a schematic diagram of a face with extracted eye and mouth regions, for illustrating a course-to-fine landmark finding technique.

As shown in FIG. 13, the facial features corresponding to the nodes may be classified to account for inappropriate tracking error indications such as, for example, blinking or mouth opening. Labels are attached to the different jets in the bunch graph corresponding the facial features, e.g., eye open/closed, mouth open/closed, etc. The labels may be copied along with the corresponding jet in the bunch graph which is most similar one compared to the current image. The label tracking may be continuously monitored, regardless of whether a tracking error detected. Accordingly, classification nodes may be attached to the tracked nodes for the following:

eye open/closed
mouth open/closed
tongue visible or not
hair type classification
wrinkle detection (e.g., on the forehead)

Thus, tracking allows utilization of two information sources. One information source is based on the feature locations, i.e. the node positions, and the other information source is based on the feature classes. The feature class information is more texture based and, by comparing the local image region with a set of stored examples, may function using lower resolution and tracking accuracy then feature class information that is based solely on the node positions.

Figure 14:
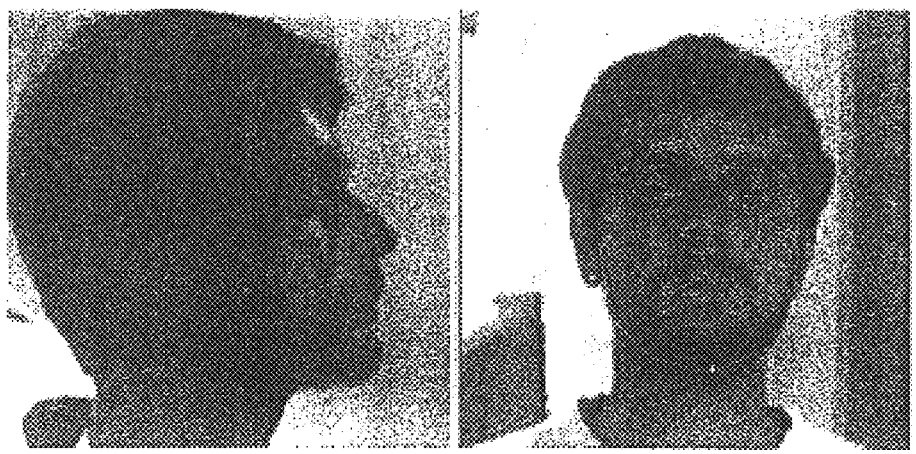
FIG. 14 are photographs showing the extraction of profile and facial features using the elastic bunch graph technique of FIG. 6.

The facial sensing of the invention may be applied to the creation and animation of static and dynamic avatars as shown in FIG. 14. The avatar may be based on a generic facial model or based on a person specific facial model. The tracking and facial expression recognition may be used for the incarnation the avatar with the person's features.

The generic facial model may be adapted to a representative number of individuals and may be adapted to perform realistic animation and rendering of a wide range of facial features and/or expressions. The generic a model may be obtained by the following techniques.

1. Mono-camera systems may be used (T. Akimoto et al. 1993) to produce a realistic avatar for use in low-end tele-immersion systems. Face profile information of individuals, as seen from sagital and coronal planes, may be merged to obtain the avatar.
2. Stereo-camera systems are able to perform accurate 3-D measurements when the cameras are fully calibrated (camera parameters are computed through a calibration process). An individual facial model may then be obtained by fitting a generic facial model to the obtained 3-D data. Because stereo algorithms do not provide accurate information on non-textured areas, projection of active-textured light may be used.
3. Feature-based stereo techniques where markers are used on the individual face to compute precise 3-D positions of the markers. 3-D information is then used to fit a generic model.
4. 3-dimensionnal digitizers in which a sensor or locating device is moved over each surface point to be measured.
5. Active structured light where patterns are projected and the resulting video stream is processed to extract 3D measurements.
6. Laser-based surface scanning devices (such as those developed by Cyberware, Inc) that provide accurate face measurements.
7. A combination of the previous techniques.

These differing techniques are not of equal convenience to the user. Some are able to obtain measurements on the individual in a one-time process (the face being in a desired posture for the duration of the measurement), while others need a collection of samples and are more cumbersome to use.

A generic three-dimensional head model for a specific person can be generated using two facial images showing a frontal and a profile view. Facial sensing enables efficiently and robustly generation of the 3-D head model.

Facial contour extraction is performed together with the localization of the person's eyes, nose, mouth and chin. This feature location information may be obtained by using the using the elastic bunch graph technique in combination with hierarchical matching to automatically extract facial features as shown in FIG. 14. The feature location information may then be combined (see T. Akimoto and Y. Suenaga. Automatic Creation of 3D Facial Models. In IEEE Computer Graphics & Applications, pages 16–22. September 1993.) to produce a 3D model of the person's head. A generic three dimensional head model is adapted so that its proportions are related to the image's measurements. Finally, both side and front images may be combined to obtain a better texture model for the avatar, i.e. the front view is used to texture map the front of the model and the side view is used for the side of the model. Facial sensing improves this technique because extracted features may be labeled (known points may be defined in the profile) so that the two images need not be taken simultaneously.

An avatar image may be animated by the following common techniques (see F. I. Parke and K. Waters. Computer Facial Animation. A K Peters, Ltd. Wellesley, Mass., 1996).

1. Key framing and geometric interpolation, where a number of key poses and expressions are defined. Geometric interpolation is then used between the key frames to provide animation. Such a system is frequently referred to as a performance-based (or performance-driven) model.
2. Direct parameterization which directly maps expressions and pose to a set of parameters that are then used to drive the model.
3. Pseudo-muscle models which simulate muscle actions using geometric deformations.

4. Muscle-based models where muscles and skin are modeled using physical models.
5. 2-D and 3-D Morphing which use 2D morphing between images in a video stream to produce 2D animation. A set of landmarks are identified and used to warp between two images of a sequence. Such a technique can be extended to 3D (See, F. F. Pighin, J. Hecker, D. Lischinski, R. Szeliski, and D. H. Salesin. Synthesizing Realistic Facial Expressions from Photographs. In SIGGRAPH 98 Conference Proceedings, pages 75–84. July 1998.).
6. Other approaches such as control points and finite element models.

For these techniques, facial sensing enhances the animation process by providing automatic extraction and characterization of facial features. Extracted features may be used to interpolate expressions in the case of key framing and interpolation models, or to select parameters for direct parameterized models or pseudo-muscles or muscles models. In the case of 2-D and 3-D morphing, facial sensing may be used to automatically select features on a face providing the appropriate information to perform the geometric transformation.

Figure 15:
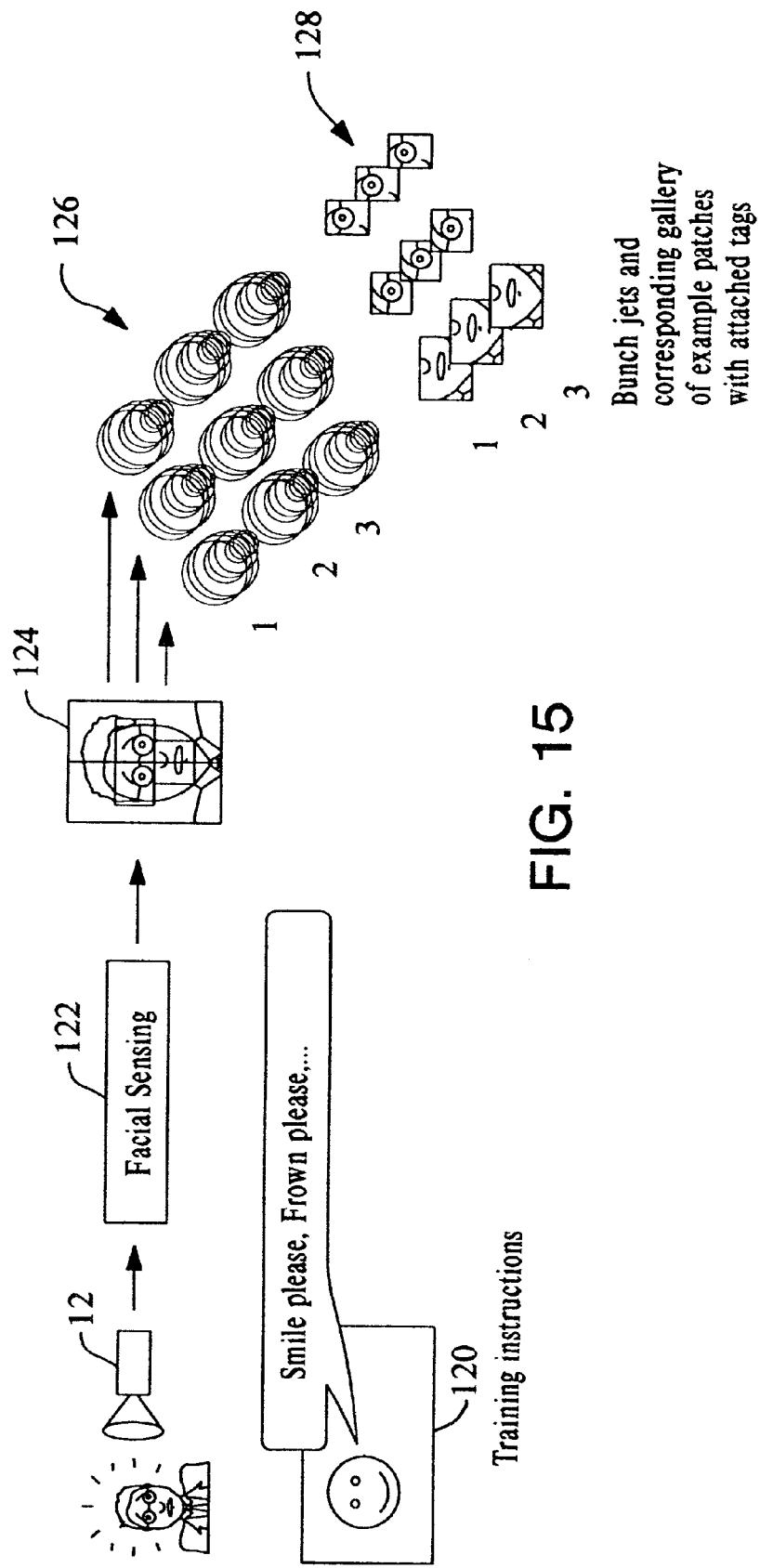
FIG. 15 is a flow diagram showing the generation of a tagged personalized bunch graph along with a corresponding gallery of image patches that encompasses a variety of a person's expressions for avatar animation, according with the invention.

An example of an avatar animation that uses facial feature tracking and classification may be shown with respect to FIG. 15. During the training phase the individual is prompted for a series of predetermined facial expressions (block 120), and sensing is used to track the features (block 122). At predetermined locations, jets and image patches are extracted for the various expressions (block 124). Image patches surrounding facial features are collected along with the jets 126 extracted from these features. These jets are used later to classify or tag facial features 128. This is done by using these jets to generate a personalized bunch graph and by applying the classification method described above.

Figure 16A:
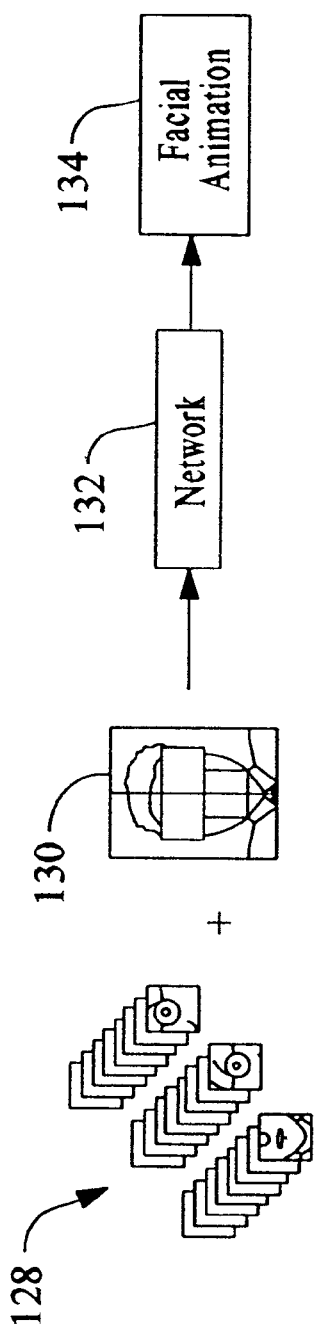
FIG. 16 is a flow diagram showing a technique for animating an avatar using image patches that are transmitted to a remote site, and that are selected at the remote site based on transmitted tags based on facial sensing associated with a person's current facial expressions.
Figure 16B:
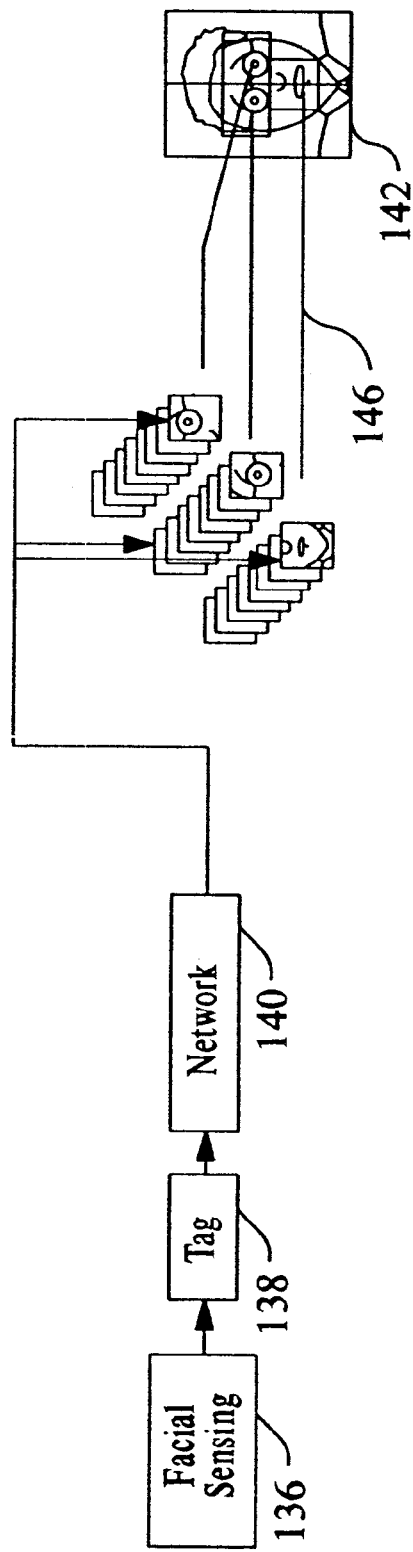

As shown in FIG. 16, for animation of an avatar, the system transmits all image patches 128, as well as the image of the whole face 130 (the "face frame") minus the parts shown in the image patches to a remote site (blocks 132 & 134). The software for the animation engine also may need to be transmitted. The sensing system then observes the user's face and facial sensing is applied to determine which of the image patches is most similar to the current facial expression (blocks 136 & 138). The image tags are transmitted to the remote site (block 140) allowing the animation engine to assemble the face 142 using the correct image patches.

To fit the image patches smoothly into the image frame, Gaussian blurring may be employed. For realistic rendering, local image morphing may be needed because the animation may not be continuous in the sense that a succession of images may be presented as imposed by the sensing. The morphing may be realized using linear interpolation of corresponding points on the image space. To create intermediate images, linear interpolation is applied using the following equations:

$$P_i = (2-i)P_1 + (i-1)P_2 \quad (7)$$

$$I_i = (2-i)I_1 + (i-1)I_2 \quad (8)$$

where $P_1$ and $P_2$ are corresponding points in the images $I_1$ and $I_2$, and $I_i$ is the $i^{th}$ interpolated image: with $1 \leq i \leq 2$. Note that for process efficient, the image interpolation may be implemented using a pre-computed hash table for $P_i$ and $I_i$. The number and accuracy of points used, and their accuracy, the interpolated facial model generally determines the resulting image quality.

Thus, the reconstructed face in the remote display may be composed by assembling pieces of images corresponding to the detected expressions in the learning step. Accordingly, the avatar exhibits features corresponding to the person commanding the animation. Thus, at initialization, a set of cropped images corresponding to each tracked facial feature and a "face container" as the resulting image of the face after each feature is removed. The animation is started and facial sensing is used to generate specific tags which are transmitted as described previously. Decoding occurs by selecting image pieces associated with the transmitted tag, e.g., the image of the mouth labeled with a tag "smiling-mouth" 146 (FIG. 16).

Figure 17:
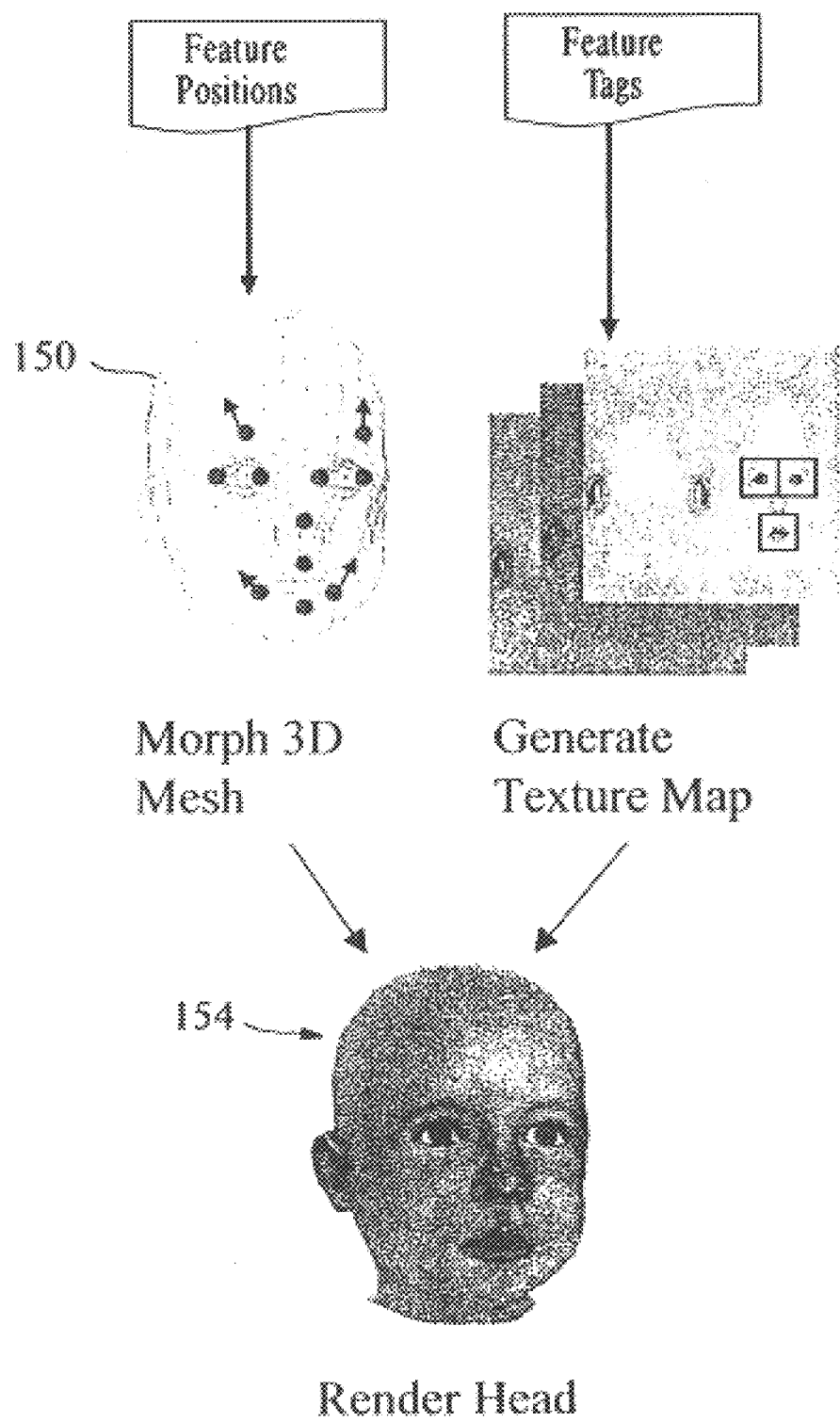
FIG. 17 is a flow diagram showing rendering of a three-dimensional-head image generated, based on facial feature positions and tags, using volume morphing integrated with dynamic texture generation.

A more advanced level of avatar animation may be reached when the aforementioned dynamic texture generation is integrated with more conventional techniques of volume morphing as shown in FIG. 17). To achieve volume morphing, the location of the node positions may be used to drive control points on a mesh 150. Next, the textures 152 dynamically generated using tags are then mapped onto the mesh to generate a realistic head image 154. An alternative to using the sensed node positions as drivers of control points on the mesh is to use the tags to select local morph targets. A morph target is a local mesh configuration that has been determined for the different facial expressions and gestures for which sample jets have been collected. These local mesh geometries can be determined by stereo vision techniques. The use of morph targets is further developed in the following references community (see, J. R. Kent, W. E. Carlson, and R. E. Parent. Shape Transformation for Polyhedral Objects. In SIGGRAPH 92 Conference Proceedings, volume 26, pages 47–54. August 1992; Pighin et al. 1998, supra).

Figure 18:
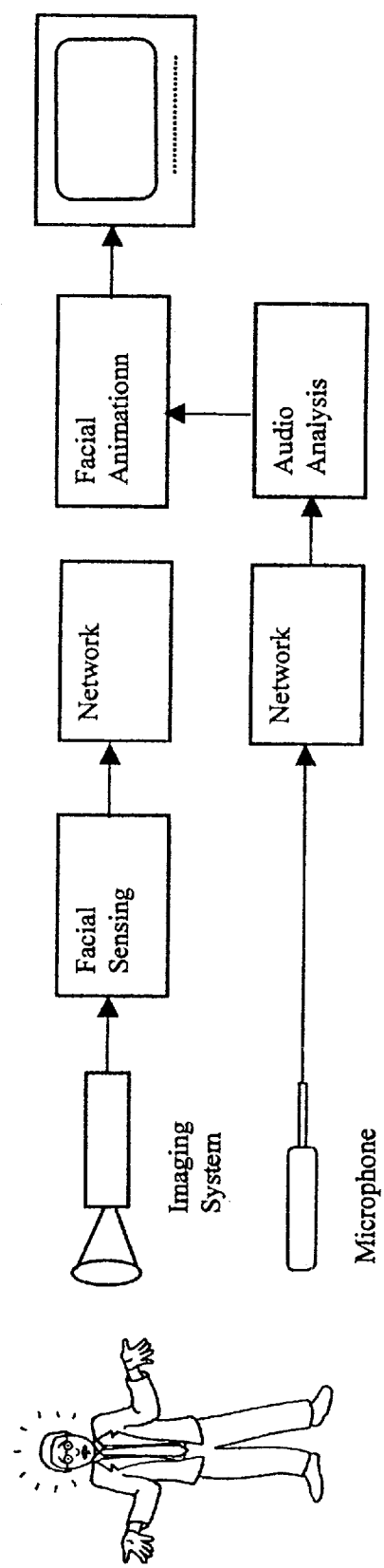
FIG. 18 is a block diagram of an avatar animation system, according to the invention, that includes audio analysis for animating an avatar.

A useful extension to the vision-based avatar animation is to integrate the facial sensing with speech analysis in order to synthesize the correct lip motion as shown in FIG. 18. The lip synching technique is particularly useful to map lip motions resulting from speech onto an avatar. It is also helpful as a back-up in case the vision-based lip tracking fails.

Although the foregoing discloses the preferred embodiments of the present invention, it is understood that those skilled in the art may make various changes to the preferred embodiments without departing from the scope of the invention. The invention is defined only the following claims.

What is claimed is:

1. A method for generating a head model specific to a person for use in animating a display image having the person's features, the method comprising the steps for:

providing a frontal facial image of the person, the frontal facial image having an array of pixels;

providing a profile facial image of the person, the profile facial image having an array of pixels;

transforming the frontal facial image using wavelet transformations to generate a transformed frontal image having an array of pixels, each pixel of the transformed frontal image being associated with a respective pixel of the frontal facial image and being represented by a frontal transform jet associated with a predetermined number of wavelet component values;

transforming the profile facial image using wavelet transformations to generate a transformed profile image having an array of pixels, each pixel of the transformed profile image being associated with a respective pixel of the profile facial image and being represented by a profile transform jet associated with a predetermined number of wavelet component values;

locating predetermined facial features in the transformed frontal image based on a comparison between the frontal transform jets of the transformed frontal facial image and frontal graph jets at sensing nodes of a frontal graph;

locating predetermined facial features in the transformed profile image based on a comparison between the profile transform jets of the transformed profile facial image and sensing nodes at profile graph jets of a profile graph;

producing a three-dimensional model of the person's head using the frontal facial image and the profile facial image and based on the positions of the predetermined features located in the transformed frontal facial image and the predetermined features located in the transformed profile facial image;

displaying the head model as a display image.

2. A method for generating a head model as defined in claim 1, wherein the positions of the predetermined features are associated with respective nodes for animating the head model.

3. A method for generating a head model as defined in claim 1, wherein the predetermined facial features associated with the frontal facial image include the person's eyes, nose, mouth, and chin.

4. A method for generating a head model as defined in claim 1, wherein the predetermined facial features associated with the profile facial image include the person's eyes, nose, mouth, and chin.

5. A method for generating a head model as defined in claim 1, wherein the wavelet transformations use Gabor wavelets.

6. A method for generating a head model as defined in claim 1, wherein each wavelet component value is generated based on a Gabor wavelet having a particular orientation and frequency.

7. A method for providing a display avatar having a specific person's features, the method comprising the steps for:

providing a frontal facial image of the person, the frontal facial image having an array of pixels;

providing a profile facial image of the person, the profile facial image having an array of pixels;

transforming the frontal facial image using wavelet transformations to generate a transformed frontal image having an array of pixels, each pixel of the transformed frontal image being associated with a respective pixel of the frontal facial image and being represented by a frontal transform jet associated with a predetermined number of wavelet component values;

transforming the profile facial image using wavelet transformations to generate a transformed profile image having an array of pixels, each pixel of the transformed profile image being associated with a respective pixel of the profile facial image and being represented by a profile transform jet associated with a predetermined number of wavelet component values;

locating predetermined facial features in the transformed frontal facial image based on a comparison between the frontal transform jets of the transformed frontal facial image and frontal graph jets at sensing nodes of a frontal graph;

locating predetermined facial features in the transformed profile facial image based on a comparison between the profile transform jets of the transformed profile facial image and sensing nodes at profile graph jets of a profile graph;

producing the display avatar using the frontal facial image and the profile facial image and based on the positions of the predetermined features located in the transformed frontal facial image and the predetermined features located in the transformed profile facial image;

displaying the display avatar.

8. A method for providing a display avatar as defined in claim 7, wherein the positions of the predetermined features are associated with respective nodes for animating the avatar.

9. A method for providing a display avatar as defined in claim 7, wherein the predetermined facial features associated with the frontal facial image include the person's eyes, nose, mouth, and chin.

10. A method for providing a display avatar as defined in claim 7, wherein the predetermined facial features associated with the profile facial image include the person's eyes, nose, mouth, and chin.

11. A method for providing a display avatar as defined in claim 7, wherein the wavelet transformations use Gabor wavelets.

12. A method for providing a display avatar as defined in claim 7, wherein each wavelet component value is generated based on a Gabor wavelet having a particular orientation and frequency.

* * * * *